May 9, 1933.  J. D. BOOTH  1,907,487
TUBE VOLTMETER
Filed July 16, 1929

INVENTOR
James D. Booth.
BY
*Wesley G. Carr*
ATTORNEY

Patented May 9, 1933

1,907,487

UNITED STATES PATENT OFFICE

JAMES D. BOOTH, OF LONGMEADOW, MASSACHUSETTS, ASSIGNOR TO WESTINGHOUSE ELECTRIC & MANUFACTURING COMPANY, A CORPORATION OF PENNSYLVANIA

TUBE-VOLTMETER

Application filed July 16, 1929. Serial No. 378,674.

My invention relates to electrical measuring instruments and more particularly to vacuum-tube voltmeters.

A number of so called "tube-voltmeters" have been designed and used, but none of them have been capable of measuring true root-mean-square values of voltage, and this is particularly true at audio frequencies. All of the vacuum-tube voltmeters of which I am aware, have been designed with the assumption that the waves encountered are perfectly sinusoidal. Although this assumption may approximate a true condition in the case of radio-frequency waves, it does not hold in the case of audio-frequency conditions, and, in every case of which I am aware, the possibility of harmonics has either been completely disregarded or it has been admitted that harmonics interfere with the calibration.

It is an object of my invention, therefore, to provide means for accurately measuring the root-mean-square value of an alternating voltage regardless of the wave form or frequency.

A further object of my invention is to provide an inexpensive and accurate vacuum-tube voltmeter having a low power consumption.

In accordance with my invention, I have designed a voltmeter which measures RMS voltages correctly regardless of the wave form of the voltage being measured and, in addition, it is capable of measuring direct-current voltages regardless of polarity and without alteration or correction in changing from direct-current to alternating-current-voltage measurements. The accuracy of my voltmeter is as good as that of the usual portable indicating-type voltmeter and possesses the additional advantage that errors caused by frequency variations are negligible, and the power consumption is materially less.

Figure 1:
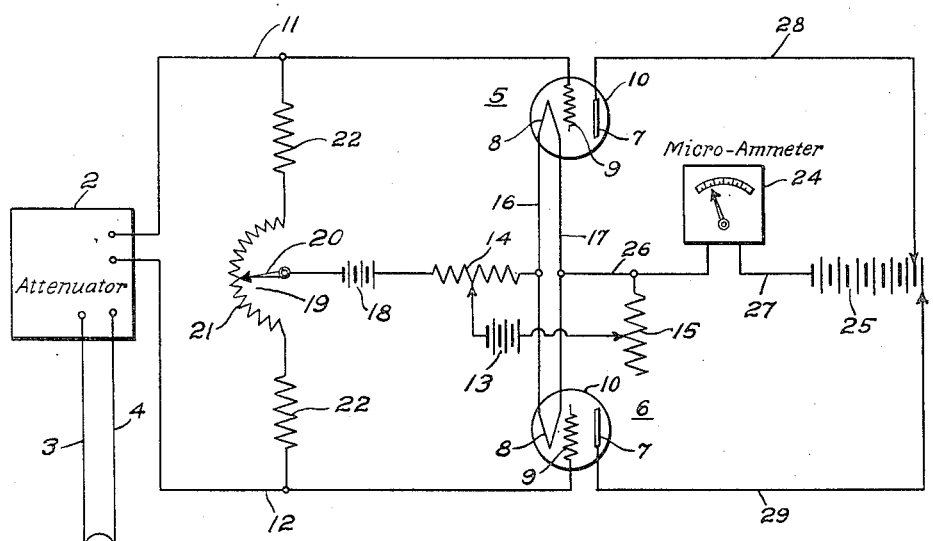

The nature of my invention and its method of use will be more fully explained in connection with the drawing, wherein Fig. 1 is a diagrammatic view of a tube voltmeter constructed in accordance with my invention.

Figure 2:
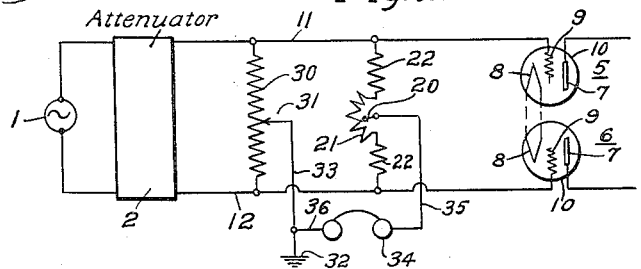
Figure 3:
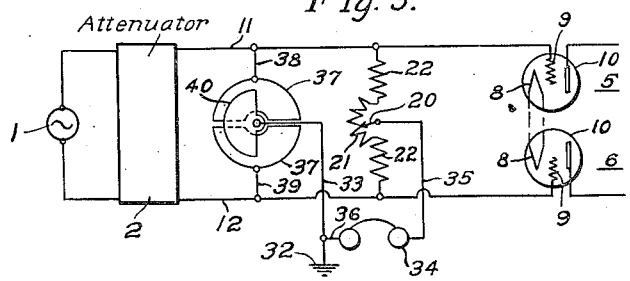

Fig. 2 is a diagrammatic view of apparatus for balancing an input circuit to ground, and Fig. 3 is a view, similar to Fig. 2 of a modification thereof.

In the drawing, 1 represents a source of voltage to be measured and 2 is an attenuator or potentiometer connected to the voltage source 1 by conductors 3 and 4. Two thermionic tubes 5 and 6 of the audion type, each comprising an anode or plate 7, a heated filament or electron-emitting cathode 8 and an auxiliary electrode or grid 9, all sealed in an evacuated vessel 10, are so connected that their plate currents are additive but the voltage placed in series with the grid bias is positive for one tube and negative for the other.

The output circuit of the attenuator 2 is connected, by conductors 11 and 12, to the grids 9 of the tubes 5 and 6, respectively. The filaments 8 of the two tubes are connected to a battery 13 through adjustable resistors 14 and 15 and conductors 16 and 17.

A negative bias is impressed on the grids 9 of the tubes 5 and 6 by a battery 18 having its positive terminal connected to the variable resistor 14 and its negative terminal connected to a potentiometer 19 through a movable contactor 20. The ends of the resistor 21 of the potentiometer 19 are connected, through fixed resistors 22, to the conductors 11 and 12, respectively, leading to the grids 9 of the tubes 5 and 6. The potentiometer 19 is used to compensate for the difference in amplification constants as well as other minor irregularities in the two tubes.

The output circuit of the tubes 5 and 6 includes a micro-ammeter 24 and a battery 25 connected in series-circuit relation with the plate 7 and filament 8 of each of the tubes 5 and 6. Conductor 26 connects one terminal of the micro-ammeter 24 to the conductor 17 of the filaments 8 of the tubes 5 and 6. Conductor 27 connects the other terminal of the micro-ammeter 24 to the negative terminal of the battery 25, and conductors 28 and 29, respectively, connect the positive terminal of the battery 25 to the plates 7 of the tubes 5 and 6.

The conductors 28 and 29 are connected to the battery 25 in such manner that the voltage therefrom to the plates or anodes 7 may be varied or made dissimilar to each other for purposes of adjustment.

Means for balancing the input to the tubes 5 and 6 from the attenuator 2 are illustrated in Figs. 2 and 3.

In Fig. 2 a standard Wagner earth connection is illustrated and comprises a resistor 30 connected across the conductors 11 and 12. A movable contactor 31 is connected between the resistor 30 and ground 32 by a conductor 33. A pair of telephone receivers 34 are connected to the contactor 20 by a conductor 35 and to the conductor 33 by a conductor 36.

The position of the contactor 31 of the resistor 30 is adjusted until the telephone receivers are quiet, at which position the currents through the resistors 22 are equal and no stray currents exist between the mid point of the contactor 20 and ground.

A modification of the input balance shown in Fig. 2 is illustrated in Fig. 3. In this modification, the variable resistor 30 has been replaced by a variable condenser having a double stator consisting of plates 37 connected, respectively, to the conductors 11 and 12 by conductors 38 and 39, and a movable plate 40 connected to ground by the conductor 33. The plate 40 is adjusted until there is no response in the phones, as described above in connection with the variable resistor 30, by the use of the modified Wagner earth connection, shown in Fig. 3, all stray capacity currents to ground are eliminated, and the accuracy of the instrument is noticeably improved under adverse conditions.

The operation of the meter may be described by the following method.

$I_p - a = kE^2$. (1). The current in the D. C. meter 24 is "$I_p$," and the voltage applied to the input terminals 3 and 4 is "$E$". Both of these quantities are static values having the dependence indicated in the above equation (1). "$E$" is the independent variable and "$I_p$" is the dependent variable. "$a$" and "$k$" are, for the purposes of this discussion, considered as constants. If any value is assigned to "$E$", the value of $I_p - a$ is proportional to the square of the value "$E$". In other words, the change in plate current is proportional to the square of the voltage applied to the input terminals. It may be well to note that the numerical value of "$a$" is determined experimentally by letting $E = 0$ whereupon $a = I_p$. It is also convenient to let (1) $I_p - a = \Delta I_p$ and to neglect "$k$". This last assumption is justified by the fact that, if proper units are chosen, "$k$" can be made equal to "1" numerically and, therefore, vanishes from the equation. We will, therefore, consider the simplified equation. (2) $\Delta I_p = E^2$.

In practice, the D. C. meter 24 is calibrated to read "$\Delta I_p$" in suitable units.

We have seen that the change in plate current is proportional to the square of the applied voltage. Now, if we start the calibration of the D. C. meter 24 at a numerical value equal to "$a$" and use the proper units, we will find that the meter reading ($\Delta I_p$) equals the square of the applied voltage, ($E^2$).

Since the root-mean-square, or RMS value of a D. C. voltage is equal to its peak value, no further proof is necessary to show that the voltmeter deflection ($\Delta I_p$) is equal to the square of the RMS voltage ($E^2$) applied.

Suppose the applied voltage is a sine wave having an RMS value of $E_r$. The peak value of this is $\sqrt{2E_r}$ (see A. C. text books for proof of this). The equation of this wave is $$E = \sqrt{2} E_r \sin qt$$

where $q = 2\pi f$ and $f$ = frequency, $\pi = 3.1416$ $t$ = time. (This is also proved in nearly all A. C. text books.)

If $E = \sqrt{2} E_r \sin qt$;
$E^2 = 2 (E_r)^2 \sin^2 qt$
and from trigonometry $$\sin^2 qt = \frac{1 - \cos 2 qt}{2}$$

so it follows that
$E^2 = (E_r)^2 - (E_r)^2 \cos 2 qt$.
Then, from (2) meter deflection
$(\Delta I_p) = (E_r)^2 - (E_r)^2 \cos 2 qt$.
A D. C. meter (D'Arsonval type) shows a deflection proportional to the average current if it is sufficiently well damped so that it does not follow the variations in the current. (See text books on measurements for further details.)

The average value of any alternating current is zero. (This is also an elementary A. C. text book proof.) The average value of $$(E_r)^2 - (E_r)^2 \cos 2 qt \text{ is } (E_r)^2.$$

The A. C. component $(E_r)^2 \cos 2 qt$ has no effect on the D. C. meter reading. Therefore, the deflection ($\Delta I_p$) equals the square of the RMS voltage $(E_r)^2$ applied.

Suppose the applied voltage is a complex wave made up of two sine-wave components of different frequencies and a D. C. component.

$$E = \sqrt{2} E_1 \sin pt + \sqrt{2} E_2 \sin qt + E_3$$

$E_1$ = the RMS value of the voltage of frequency $f_1$
$E_2$ = the RMS value of the voltage of frequency $f_2$
$E_3$ = the RMS value of the voltage of D. C.
$p = 2\pi f_1$   $q = 2\pi f_2$.

The RMS value (numerical) of this complex wave is equal to the square root of the sum of the squares of the RMS values of each wave or (3)   $E = \sqrt{(E_1)^2 + (E_2)^2 + (E_3)^2}$ numerically (This is proved in most A. C. text books.)
From (2)

$$\Delta I_p = 2(E_1)^2 \sin^2 pt + 2(E_2)^2 \sin^2 qt + (E_3)^2$$

as before $$\sin^2 pt = \frac{1-\cos 2pt}{2}$$

so $$\Delta I_p = (E_1)^2 - (E_1)^2 \cos 2 pt + (E_2)^2 - (E_2)^2 \cos 2 qt + (E_3)^2$$
$$= (E_1)^2 + (E_2)^2 + (E_3)^2 - (E_1)^2 \cos 2 pt - (E_2)^2 \cos 2 qt$$

(4) The deflection of the D. C. meter is $$(E_1)^2 + (E_2)^2 + (E_3)^2$$

but since $$E = \sqrt{(E_1)^2 + (E_2)^2 + (E_3)^2}$$

from (3), $$E^2 = (E_1)^2 + (E_2)^2 + (E_3)^2$$

Then from (3) and (4) the deflection of the D. C. meter $(\Delta I_p) = E^2$. In other words, the deflection of the D. C. meter is equal to the square of the RMS value of any wave, regardless of its wave form.

Method 2:

(1) $I_p - a = kE^2$ as before which is reducible by the same process as in Method 1 to the form (2) $\Delta I_p = E^2$.

The square of the RMS value of a voltage wave is the average of the squared values of the instantaneous voltages by definition. (This is usually given in text books as $$E^2\text{rms} = \frac{1}{2\pi}\int_0^{2\pi} e^2 d\theta.$$

Now, the direct-current-meter deflection varies only as the average of the instantaneous values of plate current and, since $\Delta I_p = E^2$ (2), we may say that the meter deflection varies as the average of the squared instantaneous values of applied voltage. But, since the average of squared instantaneous values of the applied voltage is its RMS value squared, then it follows that the meter deflection varies as the square of the RMS value of the voltage applied to the device.

The deflection will be the same when direct-current is impressed on the grids as when the same RMS value of alternating-current is impressed. It will be noted that the direction of the direct current is not important. The device may then be calibrated on direct-current and will indicate RMS values of alternating current. This indication will be accurate, regardless of wave form.

Several corrections are desirable but need not be made unless extreme accuracy is desired. However, it is essential that the plate voltages on the two tubes be adjusted separately to give the same plate current with the same grid bias. It is also best to so adjust the input resistors that the plate current will be the same in each tube when direct-current is applied to the input terminals and reversed. If high accuracy is desired, the plate voltage will be adjusted until the change in plate current from the initial reading is proportional to the square of the impressed voltage.

A vacuum-tube voltmeter, constructed in accordance with my invention, has the following advantages over prior devices:

The meter indicates true RMS values for the complete cycle since each tube takes care of one-half. Prior meters utilizing only one tube indicate correctly only when the wave is symmetrical; i. e. contains no even harmonics or direct-current.

The meter may be calibrated on direct-current.

The meter indicates low voltages of approximately one volt more accurately than many direct-current meters.

The meter is rugged and will stand large overloads without danger of burnout.

The input impedance may be made very high without materially reducing its sensitivity or accuracy.

High-resistance resistors may be inserted in series-circuit relation with the grids to safeguard the meter from extreme overloads because the grid current will provide additional bias. Such expedient does not effect the calibration of the meter at audio frequencies.

The fact that almost perfect squaring action is obtained is due largely to the summation of two semi-parabolic functions. Ordinarily, such functions become erratic for small values. By summing them up, however, the errors become so small as to be unnoticeable. I have found it possible to adjust this exponential function over a rather large range of values by changing the plate voltage. Variations in grid voltage have a similar effect on the exponent.

I do not limit my invention to the specific arrangements illustrated, as various modifications may be made without departing from the spirit and scope of the invention, as set forth in the appended claims.

I claim as my invention:

1. In combination a plurality of thermionic tubes severally comprising a cathode, an anode and an auxiliary electrode in an evacuated vessel, a measuring instrument and a source of voltage associated with the anodes and cathodes of said rectifiers, means to compensate for the difference in amplification constants of each of said tubes, and means for applying a voltage to be measured to said auxiliary electrodes.

2. In combination, two thermionic tubes severally comprising a cathode, an anode and an auxiliary electrode in an evacuated vessel, a current-measuring instrument and a battery connected between said anode and said cathode of each of said tubes, means to compensate for the difference in amplification constants of each of said tubes, and means for applying voltage to be measured to said auxiliary electrodes.

3. A voltmeter comprising a plurality of vacuum tubes having interconnected input and output circuits, a measuring instrument in the output circuit of said vacuum tubes, means to compensate for the difference in amplification constants of said tubes, and means for impressing upon the input circuit of said vacuum tubes a voltage to be measured.

4. In a system for measuring the root-mean-square value of an alternating voltage, the combination with a measuring instrument, of two triode vacuum tubes connected in electrical-circuit relation in such manner that their plate currents are additive, and means for impressing an alternating voltage to be measured on grids of said tubes, said voltage being simultaneously positive for one tube and negative for the other tube.

5. In a vacuum-tube voltage-measuring system, a plurality of vacuum tubes severally comprising an anode, a cathode and a grid, an output circuit for said tubes including a battery and a measuring instrument in series-circuit relation with the anode and the cathode of each of said tubes, an input circuit for said tubes including a variable resistor in series-circuit relation with the cathode and the grid of each of said tubes a battery and a variable resistor for energizing said cathodes, and means for impressing a voltage to be measured on the grid circuits of said tubes.

6. In a vacuum-tube voltage-measuring system, the combination with two vacuum tubes each having an anode, a cathode and an auxiliary electrode, of a battery and a measuring instrument in series-circuit relation with the anode and cathode of each of said tubes, a battery and a variable resistor for energizing said cathodes, a battery and a variable resistor for biasing the potential of said auxiliary electrode, and means for impressing a voltage to be measured on the auxiliary electrodes of said tubes.

7. In combination, a plurality of vacuum tubes, each having a cathode, a plate, and a grid, means for conveying a voltage to be measured, means for connecting said voltage-conveying means in series circuit relation with said grids, means for adding the plate currents of said tubes, and means for measuring said added plate currents.

8. In combination, a plurality of vacuum tubes, each having a cathode, a plate and a grid, means connecting said cathodes in electrical-circuit relation, an ammeter, means connecting the plate and cathode of each of said tubes in series-circuit relation with said ammeter, means to compensate for the difference in amplification constants of said tubes, and means for impressing an electromotive-force to be measured on the grids of said tubes.

9. A tube voltmeter comprising a plurality of vacuum tubes severally comprising a grid, a filament and a plate, a micro-ammeter and a battery connected to the plates of tubes, and means for charging the grids of said tubes with a voltage to be measured, said tubes being adjusted to work on semi-parabolic grid-voltage-plate current characteristics, and said grids being oppositely charged with respect to each other by the voltage to be measured.

10. The combination with a plurality of vacuum tubes severally comprising a grid, a plate and a filament, of means for oppositely charging said grids in accordance with a voltage to be measured, means for working said tubes on semi-parabolic grid-voltage-plate-current characteristics, and means for measuring the sum of the plate currents of said tubes.

11. In a system for measuring the root-mean-square values of an alternating voltage, the combination with a measuring instrument of two plural-electrode electric discharge devices, of the type incorporating control electrodes and principal electrodes, connected in electric-circuit relation in such manner that the currents between their principal electrodes are additive, and means for impressing an alternating voltage to be measured on the control electrodes of said devices, said voltage being simultaneously of one polarity for one device and of the opposite polarity for the other device.

12. In combination, a plurality of plural-electrode electric discharge devices, each having a control electrode and a plurality of principal electrodes, means for conveying a voltage to be measured, means for connecting said voltage-conveying means in series circuit relation with said control electrodes, means for adding the currents between said principal electrodes of said devices, and means for measuring said added currents.

In testimony whereof, I have hereunto subscribed my name this tenth day of July 1929.
JAMES D. BOOTH.